Oct. 11, 1938.   R. BECK ET AL   2,133,073
METHOD OF AND APPARATUS FOR CONTROLLING PRESSURE FLUID
Filed Dec. 30, 1935   5 Sheets-Sheet 3

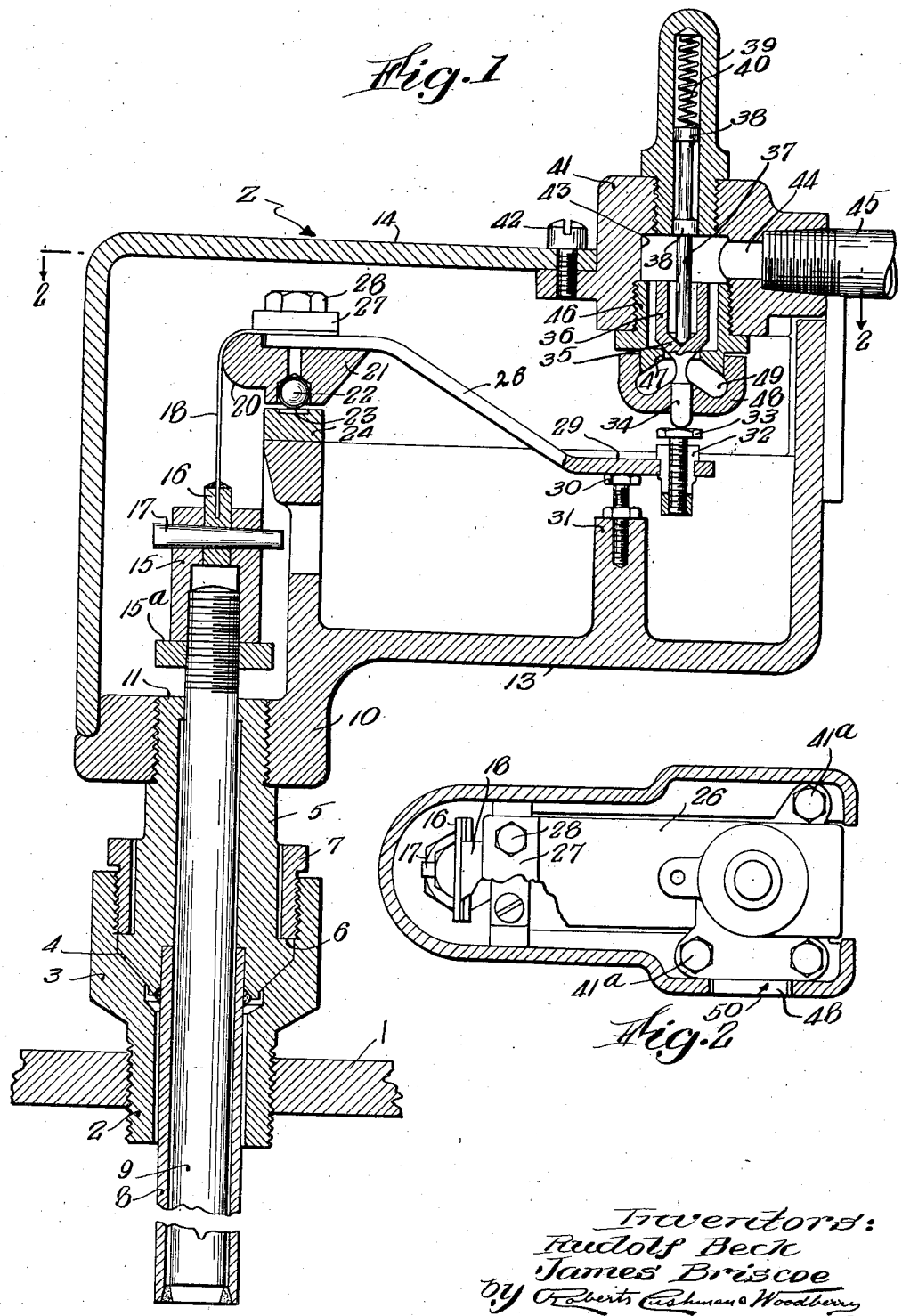

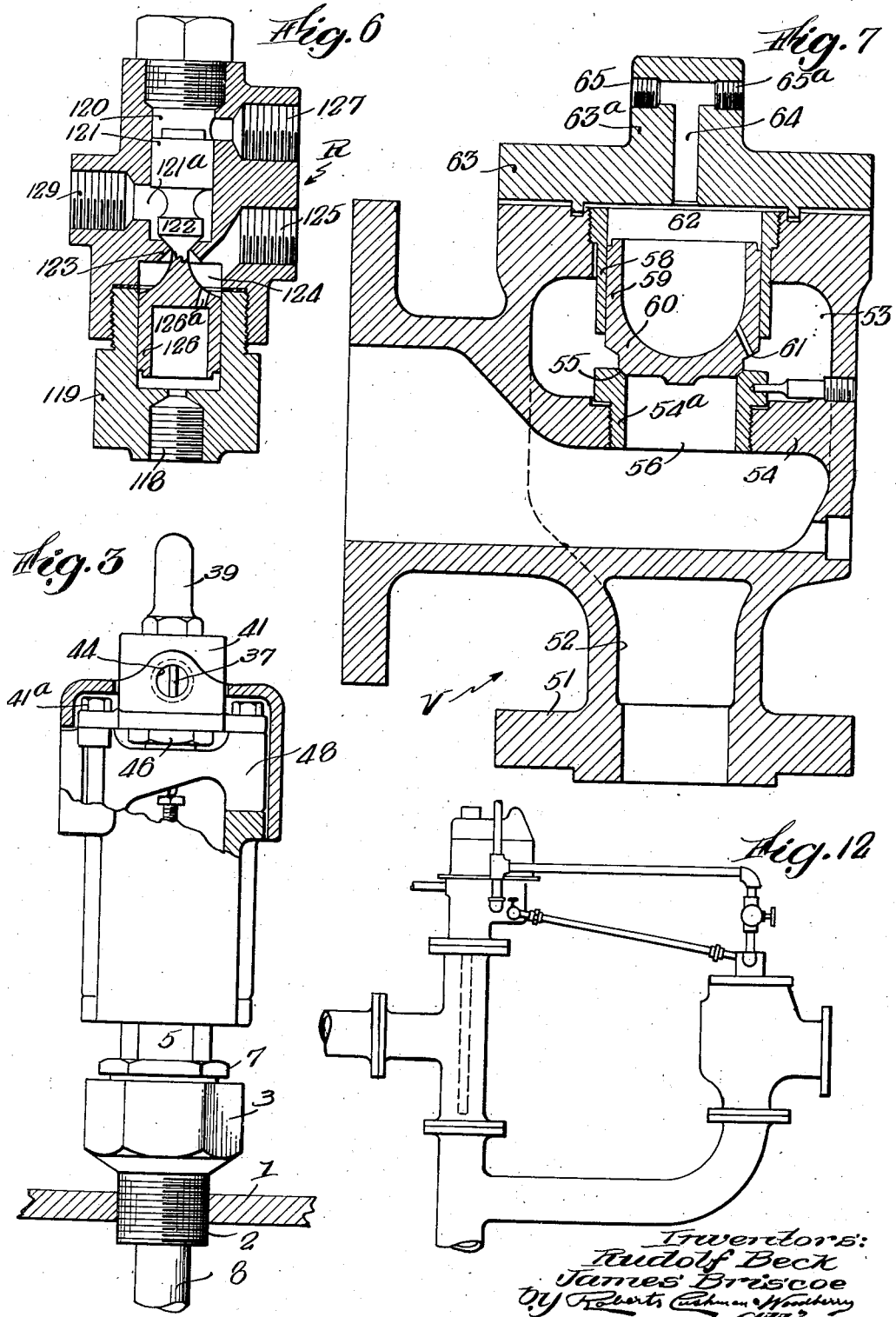

Inventors:
Rudolf Beck
James Briscoe
by Roberts Cushman Woodberry
Attys.

Oct. 11, 1938.    R. BECK ET AL    2,133,073
METHOD OF AND APPARATUS FOR CONTROLLING PRESSURE FLUID
Filed Dec. 30, 1935    5 Sheets-Sheet 4

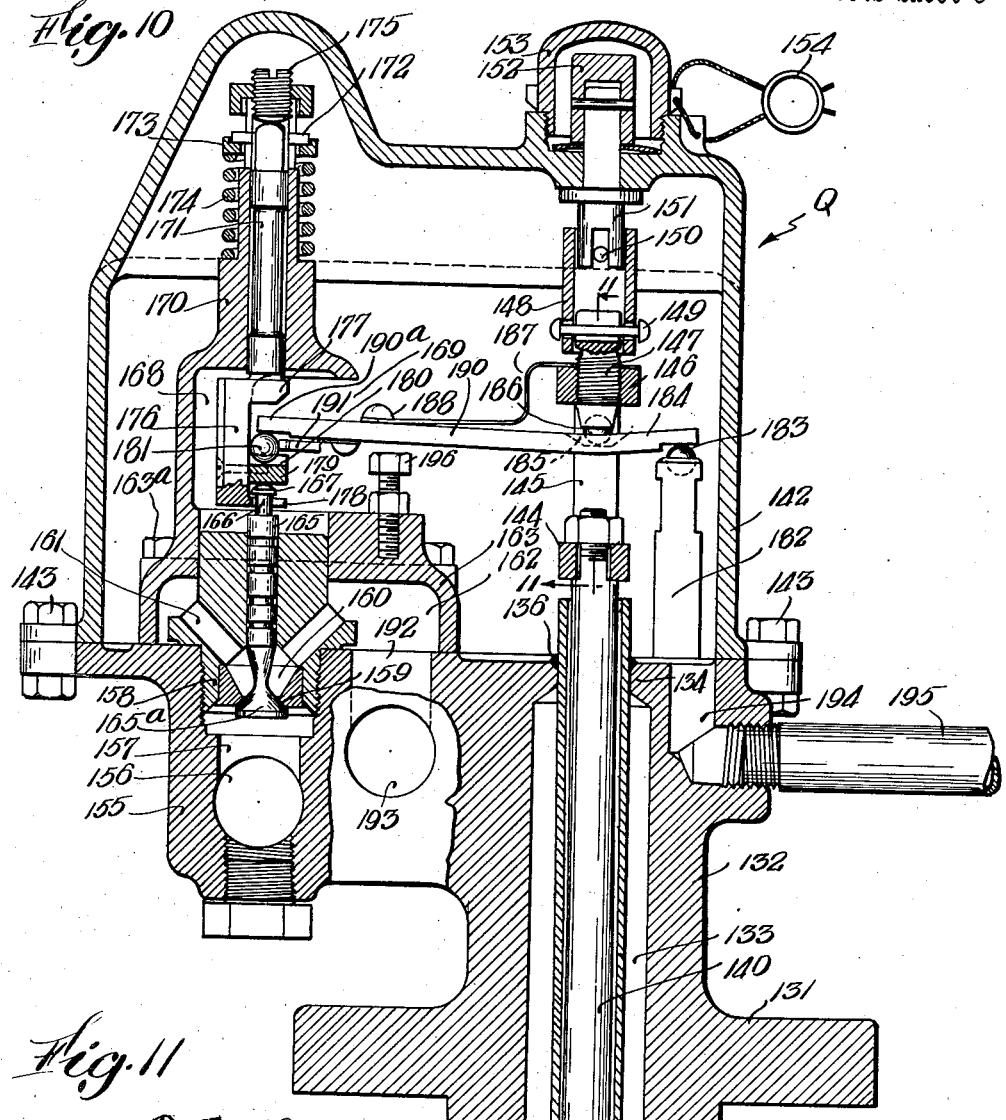
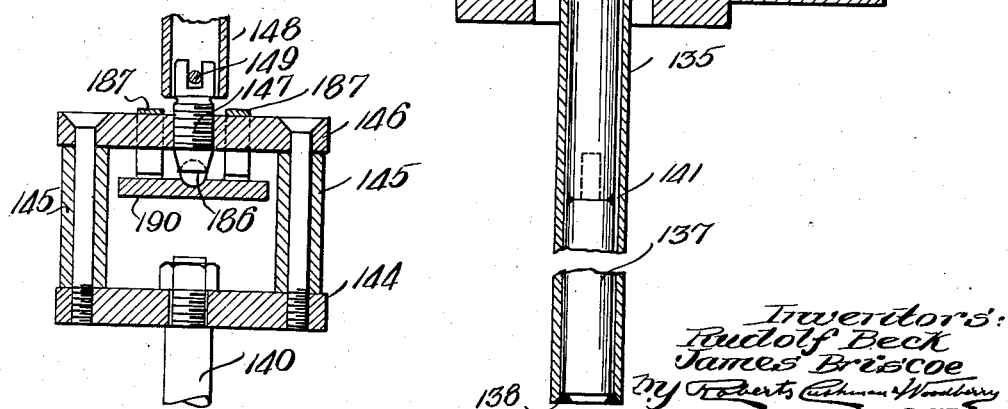

Patented Oct. 11, 1938

2,133,073

UNITED STATES PATENT OFFICE 2,133,073

METHOD OF AND APPARATUS FOR CONTROLLING PRESSURE FLUID

Rudolf Beck and James Briscoe, Bridgeport, Conn., assignors, by mesne assignments, to Manning, Maxwell & Moore, Incorporated, New York, N. Y., a corporation of New Jersey Application December 30, 1935, Serial No. 56,658

11 Claims. (Cl. 137—53)

This invention pertains to a method of and apparatus for regulating and controlling the pressure fluid in a system embodying fluid pressure generators or other containers, for example, boilers, superheaters, or oil stills, the present application for Letters Patent being a continuation-in-part of our copending application Serial No. 711,162, filed February 14, 1934, now Patent No. 2,059,722, granted Nov. 3, 1936. In its more specific aspects the invention is concerned with a novel arrangement and construction of valves, including a control valve or valves designed automatically to open and close in response to a predetermined energy characteristic of the pressure fluid, specifically to the temperature of the fluid. In the patent to Carl H. Graesser, No. 1,951,049, dated March 13, 1934, there is disclosed and broadly claimed a pressure system of the kind to which the present invention relates and on which the present invention is a specific improvement.

Under certain conditions of modern steam practice, as well as in other situations, very high temperatures and pressures are encountered. While most automatic relief or safety valves open and close in response to variations in pressure in the fluid, there are some situations in which abnormal temperature rise is more important than an excess pressure in determining the opening of the relief valve. Such a situation is found, for example, in the operation of steam superheaters, wherein the pressure fluid in the superheater does not follow the ordinary pressure-temperature relation for a saturated vapor, and wherein, unless proper precautions be taken, the temperature may rise to a point at which the metal walls of the superheater may soften and yield. It is manifest, that in dealing with steam at the high pressure now commonly generated, and particularly when the steam is superheated, it is very desirable to employ a safety or relief valve having a low blowdown, since excess blowdown under such conditions means the loss of great quantities of heat energy.

The difficulties encountered in attempting to provide a pressure responsive relief valve of large capacity and low blowdown, capable of working under present-day pressures and temperatures, are well known to those skilled in the art, and to avoid these difficulties, it is proposed, in accordance with the present invention, to employ thermally responsive means, rather than pressure responsive means, in controlling the pressure fluid in the system. With this object in view, the present invention provides improved valve means designed to respond to variations in temperature rather than variations in pressure of the working fluid and by such response to open a relief valve on the superheater; it provides for such control of the relief valve without recourse to electrical apparatus; and provides control valve means of sensitive type but so devised as to be capable of withstanding exposure to high temperature and pressure without substantial injury.

With these and other objects which will be made manifest in the more detailed description, the invention comprises, among other things, thermal motor means comprising a motor element (for example, a bimetallic couple) which is sensitively responsive to temperature change and which, by responding to a predetermined temperature condition, opens or permits to close a valve which controls a fluid passage. This control valve may, for example, be employed for controlling (directly or indirectly) the operation of a main relief valve of the pressure loaded type having a back pressure chamber provided with a restricted inlet—the thermally responsive control valve making it readily possible to obtain a very low blowdown of the main relief valve without sacrifice of capacity.

In the accompanying drawings, wherein we have illustrated one desirable embodiment of the invention by way of example, Fig. 1 is a vertical section illustrating one type of thermally responsive valve device useful directly upon the superheater, or other container in which very high temperatures are encountered;

Fig. 2 is a plan view of the device of Fig. 1, with the casing in section on line 2—2 of Fig. 1, and with certain parts broken away;

Fig. 3 is an end elevation, partly broken away and in vertical section, looking form the right-hand side of Fig. 1;

Fig. 6 is a vertical section through a relay valve device useful in association with the valves of Figs. 1 and 4;

Fig. 7 is a vertical section illustrating one desirable type of pressure loaded relief or main safety valve designed for association with and to be controlled in its operation by the valve means of Fig. 1;

Fig. 8 is a diagrammatic view illustrating a boiler and superheater provided with a set of valves such as illustrated in Figs. 1, 4, 6 and 7;

Fig. 9 is a diagrammatic view to larger scale;

Fig. 10 is a view similar to Fig. 1 but illustrating a modified and preferred form of thermally responsive valve;

Fig. 11 is a fragmentary vertical section, to smaller scale, on the line 11—11 of Fig. 10; and Fig. 12 is a diagrammatic view illustrating the use of the device of Fig. 10 for the control of a relief valve.

Figure 4:
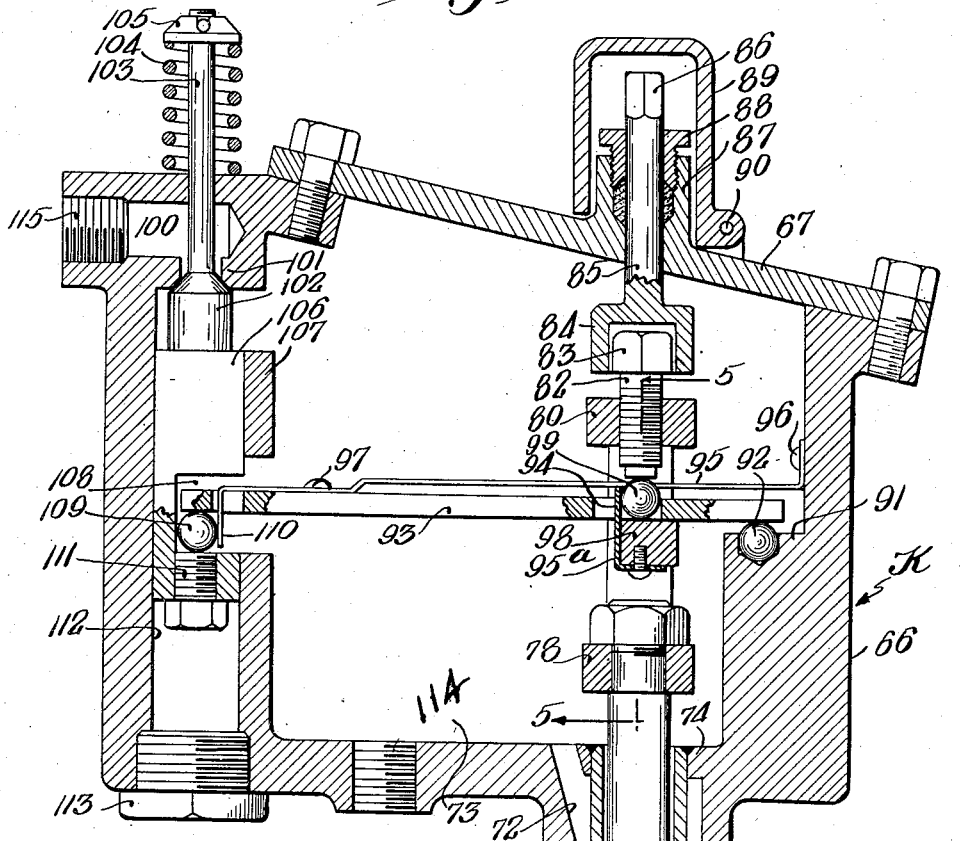
Fig. 4 is a vertical section illustrating a highly sensitive form of thermally responsive valve device useful, for example on a steam generator drum, where the temperatures are not as great as are encountered on a superheater.

In the drawings, Figs. 1 and 2 illustrate one desirable form of control valve Z. In these views, the numeral 1 designates a portion of the shell of a boiler, superheater, oil-still or other receptacle or container for pressure fluid. This shell has an internally screw-threaded opening for the reception of the screw-threaded nipple 2 having the enlarged head portion 3. When employed in high pressure installations, the screw-threaded part 2 may obviously be replaced by a standard flange integral with the head portion 3. The head 3 of the nipple is hollow and is furnished with an internal conical seat surface 4 designed to make a fluid-tight joint with a similar conical surface at the lower of a sleeve 5. This sleeve is provided with a shoulder at 6 for engagement by the inner end of a bushing 7 having screw-threaded engagement with the threaded inner wall of the nipple head 3. By means of this bushing 7 the sleeve 5 may be clamped down in steam-tight relation to the seat surface 4 of the member 3.

At its lower end the sleeve 5 is furnished with a recess which receives the upper end of a tube 8. The upper end of this tube is fixed within the recess, for example by welding, brazing, screw-threading, or in any other desired manner. This sleeve 8 extends downwardly through the nipple 2 and into the pressure-fluid space of the superheater or other receptacle, and at its lower end is fixedly united to a rod 9. This rod may be secured to the tube 8 at its lower end by means of welding, brazing, or other appropriate connecting means, and the rod extends up through the sleeve 5 and projects from the upper end of the latter, passing through an annular guide flange 11 at the upper end of the sleeve 5. The tube 8 and the rod 9 are made of materials, for example, bronze and steel, respectively, having quite different coefficients of expansion in response to temperature change. The tube 8 has a higher coefficient than the rod 9, so that when these parts are subjected to increasing temperature the different rates of expansion of the tube 8 and the rod 9 causes the rod 9 to move bodily downward, while decrease in temperature causes a reverse movement, the parts 8 and 9 thus constituting a thermal motor.

The upper end of the sleeve 5 has a screw-threaded engagement with an opening in a downwardly directed boss 10, preferably forming an integral part of the lower wall 13 of the housing of a control valve Z. This housing may be made of any suitable material, for example cast-iron or bronze, and comprises the cover member 14 which is removable from the base portion.

The upper end of the rod 9 is screw threaded and has screw-threaded engagement with a screw-threaded bore in a block 15, a lock nut 15ᵃ being provided for retaining the parts in assembled relation. The block 15 is furnished with a slot at its upper end and this slot receives a plate 16 which is preferably held in assembled relation to the block 15 by means of a cotter pin 17 passing through aligned holes in the block 15 and in the plate 16. This plate 16 is also furnished with a slot in its upper edge for the reception of the end of a flexible motion-transmitting element 18. This element may, for example, consist of a piece of thin spring steel ribbon, its lower end being permanently united to the plate 16 by brazing or the like, or by clamping screws or other suitable fastening connections. The flexible element 18 passes up and around an arcuate surface 20 at the left-hand end (as viewed in Fig. 1) of a rocker 21. This rocker may consist of a casting, or may be otherwise shaped in any appropriate way from suitable material, and has at its under side a pocket for the reception of a ball 22. This ball may be of hard steel, such for example as a bearing ball, and preferably rests upon a wear-resistant plate 23, for example, of nitrided or other hard steel or the like disposed in a suitable slot or groove in a crossbar 24, which is secured to the upper edge of a web 25 forming a part of the bottom member of the housing. The transverse stiffness of the steel ribbon 18 prevents lateral tilting of the part 21 on the single point support provided by ball 22.

The rocker 21 supports one end of a lever 26 which is of resilient material, such as spring steel. The upper part of the flexible transmitting member 18, after passing over the arcuate surface 20, is turned down onto the upper surface of the upper end portion of lever 26, and the several parts are fixedly united to the rocker 21 by means of a clamping plate 27 and bolts 28.

The free extremity of the longer arm of lever 26 is preferably disposed in a substantially horizontal plane, under normal conditions, as shown at 29, and is supported or limited in its downward movement by an adjustable stop member 30 having screw-threaded engagement with a boss 31 projecting up from the member 13. Near its free end, the lever 26 is furnished with an internally screw-threaded sleeve member 32 having a substantially vertical axis and which receives an adjustable contact member 33. This contact member is disposed immediately beneath and normally engages the lower end of a valve lifter member 34, which extends downwardly from the control or exhaust valve feather 35. This valve feather comprises a hollow body portion 36 which receives the lower end of a valve loading rod 37. This loading rod is preferably furnished with a pair of cylindrical enlargements 38 adapted to slide within a vertical bore in a guide cap 39, the upper end of which houses the valve loading spring 40, one end of which bears against the inner surface of the cap and the other end of which bears on the upper end of the loading rod 38. Since the lever arm to which the movement of the member 18 is applied is relatively short, such movement is multiplied as applied to the valve lifter 34.

The cap 39 is screw threaded at its lower end and engages a threaded opening in the valve block 41, which is removably secured in place by means of bolts 41ᵃ. The cover member 14 is secured to the block by a screw 42. This block is furnished with a chamber 43 communicating by means of a passage 44 with a screw-threaded socket adapted to receive the screw-threaded end of a pipe 45, leading from a source of supply of pressure fluid as hereinafter more fully described.

The lower part of the block 41 is furnished with a screw-threaded bore axially aligned with the opening which receives the cap 39, and this bore receives the screw-threaded sleeve-like upper part 46 of a valve seat member which is furnished near its lower end with the annular seat surface 47 with which the valve feather 35 normally cooperates. When seated, the valve feather closes the passage through the valve seat which connects the chamber 43 with an exhaust passage 49. The passage 49 extends transversely through a member 48, preferably a casting, which may be secured within the housing by means of the aforementioned bolts 41a, the exhaust passage 49 leading out to one side of the housing and terminating for example at the point 50 (Fig. 2).

If this control valve device Z, thus far described, be employed as the relief valve proper, the pipe 45 may then extend directly to the boiler or other container for the pressure fluid. However, for the purposes above mentioned, we prefer to employ the valve heretofore described merely as a control valve to determine the opening and closing of a relief valve of large capacity, and preferably of the pressure loaded type.

In Fig. 8 we have illustrated one desirable arrangement wherein the valve device Z just described is mounted on a delivery pipe D leading from the outlet end of a superheater S to a main M. The superheater receives pressure fluid from a generator G, for example, a steam boiler, through a pipe P leading from a header H connected to the boiler. As here shown, the delivery pipe is furnished with a relief valve V of large capacity and of the pressure loaded type.

In Fig. 7 we have illustrated, by way of example, one desirable form of relief valve. This valve V comprises a casing having a flange 51 by means of which it may be attached to a suitable fitting on pipe D. A passage 52 concentric with flange 51 leads up into a chamber 53 within the body of the casing. A transverse web 54 extends through the chamber 53 and supports a sleeve provided with the annular valve seat 55 surrounding the passage 56, which in turn opens into the exhaust passage 57 formed in the part within the web 54, and which extends laterally out to one side of the casing, where it may open to the atmosphere or be continued through any suitable pipe or conduit to a desired point of discharge.

The upper part of the casing is furnished with an annular guide sleeve 58 of somewhat larger internal diameter than passage 56 and which may, if desired, be of some wear-resistant material and accurately machined to provide a proper sliding contact with the hollow skirt portion 59 of the combined piston and valve feather 60. This skirt portion of the valve feather has a peripheral surface adapted to make steam-tight contact with the seat 55. The interior of the skirt portion of the valve feather, together with the upper part of the casing, forms a chamber 62 for pressure fluid above the valve 60, the space 62 constituting a back pressure chamber whose lower wall is movable. A restricted bleeder passage 61 leads through a wall of this chamber from the space 53. The valve casing is furnished with a cover 63 suitably secured by bolts (not shown), and this cover has a passage 64 communicating at one end with the back pressure chamber 62. The cover is also furnished with a boss 63a having a pair of screw-threaded sockets 65 and 65a communicating with the passage 64. The socket 65 receives the screw-threaded end of the pipe 45. Alternatively, instead of a passage such as 61 through a wall of the chamber, the valve skirt 59 may be made loose enough to provide a very narrow annular leak passage between it and the guide sleeve 58.

The valve parts are so designed and dimensioned that when pressure fluid, entering through the passage 52, fills the space 53, a portion of it enters through the bleeder opening 61 and fills the space 62 and exerts a somewhat greater pressure on the upper side of the valve feather than is exerted by the fluid in the space 53 against the lower side of the valve feather. The valve feather is thus normally held against its seat by the pressure fluid alone, so that no springs or other loading means are necessary. However, if the pressure in the chamber 62 be relieved, as by allowing pressure fluid to flow rapidly therefrom, then the effective pressure on the upper side of the valve becomes less than that on the lower side, and the valve opens very quickly to full capacity.

The generator G may be provided with a safety valve or valves T of usual type. As here shown, it is also furnished with a control valve K which, in certain details is somewhat different from the control valve Z. The valve K is illustrated in detail in Figs. 4 and 5.

This valve K comprises a casing having a body portion 66 and a removable cover 67. The bottom of the casing has downwardly directed hollow boss or nipple 68 which may have a screw-threaded portion adapted to be screwed into a screw-threaded opening in a boiler shell S (Fig. 4) or which may comprise an integral flange member 69 (Fig. 8) adapted to be secured to a fitting 70 mounted on the shell of the generator G. The nipple 68 has an axial bore 71 opening into the pressure fluid space in the generator and is provided with a branch 72 at its upper end which leads into the chamber or space 73 within the body of the casing of the valve K. At the upper end of the bore 71 an annular flange 74 constitutes a support for the upper end of a tube 75 which passes freely down through the bore 71. The upper end of the tube is fixedly secured, as by brazing, screw-threading, or the like, to the flange 74. Within this tube is arranged a rod 76 which extends freely through the tube but which is securely united to the lower end of the tube 75 at the point 77 by means of brazing, screw threading, or the like. The parts 75 and 76, as thus arranged, constitute a bimetallic thermostatic device, the tube 75 being of a material which expands more rapidly, when heated, than does the material of the rod 76. These parts may be made of the same materials mentioned as useful in the construction of the bimetallic thermostat 8, 9 of the device of Fig. 1.

Figure 5:
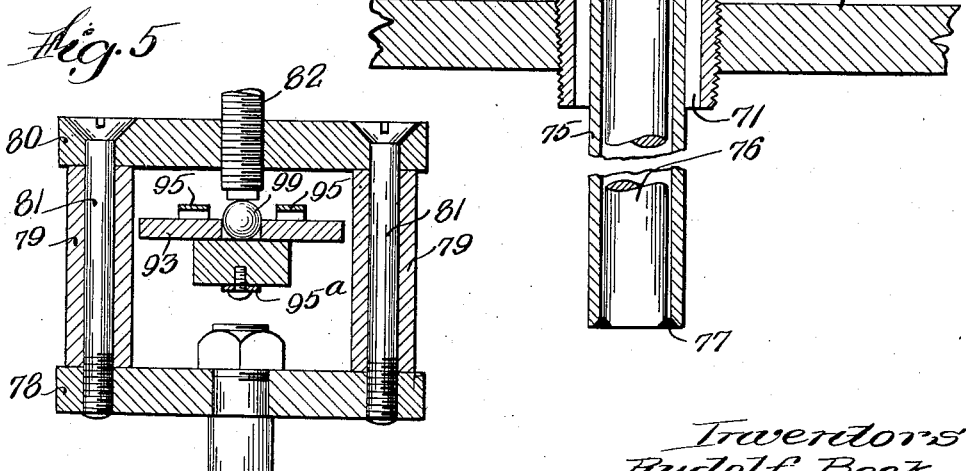
Fig. 5 is a section on line 5—5 of Fig. 4.

The rod 76 projects up into the chamber 73 of the casing and has attached thereto a transverse substantially horizontal bar 78 (Fig. 5). At its opposite ends this bar carries a pair of spacer sleeves 79 which support a yoke member 80, the parts being united by bolts 81 passing through the sleeve 79 and having screw-threaded engagement with the bar 78. The yoke member 80 is furnished with a screw-threaded opening which receives a bolt 82 having a head 83. This head fits within a socket 84 similar to that of a socket wrench, the socket 84 having a stem 85 provided with a polygonal head 86 adapted to receive a wrench or other tool whereby the stem with its socket may be turned. The stem 85 passes up through a stuffing box in a hollow boss 87 projecting from the cover 67, such stuffing box including a gland 88 adapted to compress suitable packing material to prevent leakage of pressure fluid longitudinally of the stem. A cap 89, which may be secured in place by a wire seal passing through opening 90, normally houses the upper end of the stem 85.

The inner wall of the body 66 of the casing is furnished with a ledge at 91 having a recess which receives two bearing balls 92 spaced apart less than the width of the lever 93 which they support. These balls are not movable and form a fulcrum for one end of the lever 93. The latter is of resilient material and is arranged within the chamber 73 in normally substantial horizontal position. A leaf spring 95 is fixed at 96 to the wall of the casing and extends longitudinally above the lever 93, being spaced from the latter throughout the greater part of its length, and is secured to the lever at the point 97. The lever 93 has an aperture at 94. A block 98 is welded, brazed, or otherwise secured to the under side of lever 93 and supports a ball 99 disposed within the opening 94 and held in proper position by a vertical portion of a leaf spring 95$^a$ secured to block 98. The lower end of the screw 82 is normally spaced slightly from this ball. By turning the screw 82 (by means of the socket-wrench device 84) the temperature at which the screw 82 will begin to exert pressure on ball 99 and lever 93 may be predetermined. Since the member 99 is but a short distance from the fulcrum 92, any motion of the thermostatic device is multiplied in being transmitted to the valve, now to be described.

At normal temperatures the lower end of screw 82 does not engage ball 99 and the resilient lever 93 is held loosely in contact with the balls 109 and 92 by the leaf spring 95 whose function is merely to keep the lever in proper operative position. Under normal conditions the balls 109 and 99 are positioned by the spring elements 110 and 95$^a$ respectively so that the centers of the balls are on the vertical axes of the parts 106 and 82 respectively. When the temperature rises and screw 82 begins to press downwardly on the ball 99, the lever 93 is flexed downwardly in an arc, the balls 92 forming a fixed fulcrum adjacent to one end of the lever. If it were not for the balls 109 and 99, interposed between the lever 93 and the parts 111 and 82, respectively, and which reduce the friction between the engaging parts to a minimum, such flexing of the lever (which results in a slight lateral shifting of the contact points of the balls) would result in substantial friction, thereby lessening the delicacy of operation. In particular, such friction would tend to develop side pressure of the member 106 against its guides such as would prevent valve 102 from seating accurately, with consequent leakage of steam and rapid wear of the valve seat.

The upper part of the casing 66 is furnished with a chamber 100 from which a passage, defined by an annular valve seat 101, leads into chamber 73. A control or discharge valve feather 102 normally engages the seat 101 and is furnished with a stem 103 which projects up through the top of the casing. This stem is surrounded by a light coiled spring 104 which may be adjustably tensioned by means of a nut 105 engaging the upper end of the stem 103. This spring, assisted by the fluid pressure in chamber 73, normally holds the valve feather in contact with its seat.

The valve feather 102 is furnished with a cylindrical head 106 which slides in a bore in a rib 107 on the wall of the casing. This head 106 is furnished with a vertically elongated slot 108 which receives the free end of the lever 93. This free end of the lever normally rests on a ball bearing 109 which is conveniently retained in position by a downturned end portion 110 of the spring 95, and which rests upon the upper end of an adjusting screw 111 in a threaded bore in the lower end of head 106. The head of screw 111 is disposed within a chamber 112 to which access may be had by means of a removable plug 113.

The casing has a screw-threaded opening 114 in its bottom wall, and also has a screw-threaded socket 115 leading from the chamber 100. A pipe 117 leads from the latter socket to a screw-threaded socket 118 in the lower part 119 of a casing of an exhaust valve R (Figs. 6 and 8). This second exhaust or relay valve, or its equivalent, is provided for use with the valve device of Fig. 4, since it protects the temperature sensitive elements of the latter from contact with fluid at superheater temperature, and also permits the use of the inwardly opening valve 102 and avoidance of parts passing through stuffing boxes or equivalent friction producing elements.

This exhaust valve casing is furnished with a chamber 120 at its upper part within which slides the cylindrical head portion 121 of a relay or exhaust valve feather 122 disposed within a chamber 121$^a$ near the central part of the casing. This exhaust valve feather cooperates with an annular valve seat 123 defining a passage connecting the chamber 121$^a$ and a discharge passage 124 in the lower part of the casing. Within this latter chamber slides a hollow cylindrical piston member 126. The interior of this piston, together with the lower part of casing 119, forms a chamber for pressure fluid, and a restricted bleeder passage 126$^a$ leads through the piston, which forms a movable upper wall of the chamber, into the discharge passage 124. The passage 124 is furnished with a lateral outlet 125 which may be screw-threaded if desired for the reception of an exhaust pipe, not shown, leading to any suitable point. The casing is also furnished with a screw-threaded socket 127 communicating with chamber 120 and which receives a pipe 128 leading to the opening 114 in the bottom of the casing of valve K, or to any other convenient source of saturated steam or vapor (not superheated) approximately at boiler pressure. The exhaust valve casing also has a threaded socket 129 communicating with the chamber 121$^a$, and from this socket a pipe 130 leads to the socket 65$^a$ of the main relief valve V.

By employing the control valve K in combination with the control valve Z shown in Fig. 1, and in the combination illustrated in Fig. 8, it is possible to cause the relief valve V to blow in response to excess temperature, either in the discharge pipe D from the superheater or in the generator G itself. Assuming that the bimetallic thermostat of the valve K has been designed to respond to a predetermined abnormal temperature in the generator G, and assuming that all of the other valves are closed, it may be noted that steam from the generator normally fills the chamber 73 and forces valve feather 102 against its seat 101, and keeps all of the valve parts at a substantially uniform temperature and pressure during normal operation of the generator. However, if the generator temperature rises abnormally, the thermostatic element 75 expands and pulls down on rod 76. This in turn draws the yoke 80 downwardly and imposes tension on the resilient lever 93. This tension gradually increases, thus storing energy in the lever until eventually the force exerted by the free end of the lever 93 is sufficient to slightly overbalance the steam pressure on valve 102 plus the pull of spring 104. As soon as the valve is slightly off its seat pressure will build up in chamber 100, as the steam can not escape rapidly through the restricted vent 126a of the relay or exhaust valve. Thereupon, the stored-up energy of resilient lever 93 will suddenly snap valve 102 wide open.

Fluid at generator pressure from space 73 is now permitted to flow into chamber 100 and through the pipe 117 into the space below the piston 126 of the exhaust valve R. The space 73 and pipe 117 constituting parts of a conduit leading from the generator to the exhaust valve device R. This valve has previously been held to its seat by fluid at substantially generator pressure in the chamber 120 delivered through the pipe 128. However, when the piston 126 is exposed to generator pressure by the opening of valve 102, the valve 122 is raised, it being noted that the piston 126 is of greater diameter than the piston 121. Pressure fluid is thus permitted to flow from the back pressure chamber 62 through the pipe 130 into the chamber 121a of the exhaust valve, thence through the valve seat 123 and into the exhaust passage 125. The main valve 60 is now unseated by reason of the unbalanced pressure beneath it, and the valve opens wide to permit escape of pressure fluid very rapidly from the generator.

Obviously, from the construction described, the relief valve V will blow whenever the temperature, either in the generator itself or in the superheater delivery pipe D, exceeds a predetermined temperature. The control valves herein described are of highly sensitive character such that they may readily be set to respond to a temperature variation within a range of 25° F. and it will be noted that whichever of the control valves operates first, the relief valve V, in responding, will draw steam from the superheater so that there is no possibility that the latter will become overheated by failure of a proper flow of fluid therethrough. By the use of the exhaust valve R in association with control valve K, it is possible to obtain greater sensitiveness of operation at the relatively low temperatures to which the valve K is exposed, since the thermostatic device is only required to open the delicately loaded valve device 102, whereupon fluid at generator pressure unbalances the relay or exhaust valve and releases the pressure in the back pressure chamber of the relief valve V. Since the temperature range to which control valve Z is exposed is large, the substantial movement of the parts of the thermostatic device may be depended on to produce the desired movement of the valve device 36, even though the latter be exposed to substantial pressure.

*Operation*

Assuming that the valve 60 is closed, and that the valves 35, 102 and 122 are also closed, if the temperature of the pressure fluid within the superheater rises above a predetermined point, the tube 8 expands, thus drawing the rod 9 downwardly and pulling on the flexible element 18. The pull on this element tends to tip the rocker member 21 about the fulcrum provided by the roller 22, but such movement is opposed by the action of the spring 40 and by the pressure fluid in chamber 43, which normally tend to hold the valve 35 against its seat and with the member 34 engaging the member 33. However, after the member 8 has expanded in response to the attainment of a predetermined temperature, the resilient lever 26 will have been stressed thereby, and will have stored up energy. Eventually, the force exerted by the lever will become great enough to unseat the valve slightly. As soon as pressure fluid begins to escape between the valve and its seat, the fluid pressure above the valve is reduced, and the stored-up energy of the spring will suddenly open the valve to its full extent so as to permit pressure fluid from the chamber 62 to exhaust through the pipe 45, thence through the valve seat 47 and out through the passage 49. This at once enables the unbalanced fluid pressure to open the main valve 60 so that pressure fluid is discharged very rapidly from the superheater delivery pipe D, thus maintaining a rapid flow of fluid through the superheater which will reduce the temperature in the superheater and if the discharge capacity of the valve is selected properly in relation to the heating capacity of the superheater burner, the superheater will be maintained at a safe temperature. When the temperature has been lowered, the tube 8 contracts, allowing the member 18 to rise and thus permits the spring 40 to restore the exhaust valve 35 to its seat. Pressure immediately builds up in the chamber 62 and thus closes the valve 60 so that further loss of pressure fluid is prevented.

Obviously, by choosing the members 8 and 9 of proper relative coefficients of expansion and of proper relative length, the exhaust valve 35, and hence the relief valve 60, may be made to open at substantially any desired temperature. It will be noted that only the part 8 is exposed to the maximum pressure and temperature conditions within the superheater, and that by the time the pressure fluid has passed through the chamber 53 and through the chamber 62 and thence to the chamber 43 of the control valve, its temperature will have dropped to such an extent that injury to the parts of the control valve by excess temperature need not be feared.

By the use of the motion-transmitting member 18 all movable joints between the thermally responsive element and the lever 26 are eliminated, so that there is no lost motion between these parts, and thus the operation of the control valve is very accurate and dependable. Since, as above noted, the parts of the control valve, with the exception of the part 8, are not exposed to the pressure fluid at high temperature, they do not rapidly deteriorate and are capable of performing their intended function over a long period of time without repairs. The proper working of the lever arrangements in both valve designs Fig. 1 and Fig. 4 depends on proper dimensioning of the resilient levers. A numerical example will indicate the method by which suitable dimensions may be determined. Suppose valve 35 has an effective seating area of .10 square inch and is used for 500 lbs. per square inch pressure and requires a 1/16 inch lift for operating valve 60. Further, spring 40 may exert a pressure of 10 lbs. The steam pressure on .10 square inch is 50 lbs. making a total of 60 lbs. Resilient lever 26 should then be designed so that with a load of 60 lbs. at point 33 it will deflect at least 1/16 inch.

It will be noted also, that figuring on 60 lbs. at the outside end of the lever 26, and a lever ratio of 1:5, the pull at 18 has to be about 300 lbs. and the load on ball 22 is 360 lbs. This will indicate to anyone versed in the art the reason for avoiding plain or pivot bearings and using rolling bearings throughout. Knife-edge bearings, of course, might be used, but the ball-roller transmission as indicated has the advantage of lower cost and less wear.

The valve device illustrated in Fig. 1 is primarily designed for superheater protection or other uses where high accuracy is not necessary. When such an arrangement as that of Fig. 1 is exposed to substantial variations in temperature, for example, to drafts of air, some errors in operation may result from unequal expansion or contraction of the operating parts, and this error may amount to as much as 10 to 15° F. in the temperature at which the valve will open or close. However, such relatively slight errors are of little consequence when the valve is used for superheater protection or in similar places where a temperature variation of 10 to 15° is so small a percentage of the total temperature.

While the device of Fig. 1 is useful for the purpose and under the conditions above described and may be preferable in such situations in view of its simplicity, cheapness, and the ready accessibility of the operating parts, the valve device of Fig. 4 is more useful under other conditions (for example where great accuracy in operation is required) and if desired may be substituted for the device of Fig. 1 in such a system as that illustrated in Figs. 8 and 9. The device of Fig. 4 is intended to control pressure in response to the equivalent vapor temperature and is accurate to within 2 or 3° F. It thus may be used, for example, to control the blowing of a boiler working at 500 lbs. pressure and with a blowdown of only 10 lbs. since such a blowdown corresponds to a change in vapor temperature of only 2° F. In the arrangement shown in Fig. 4 all of the operating parts are kept at substantially the same temperature by immersion in saturated vapor substantially at a boiler pressure so that changes in outside temperature do not appreciably affect the operation of the device. In this device the casing or housing 66 must be steam tight and heavy enough to sustain the boiler pressure. If the device of Fig. 4 is to be substituted for that of Fig. 1 in the system shown in Figs. 8 and 9, the passage 72 is closed and the pipe 45 is connected to the casing at 115, and the opening at 114 would constitute the discharge.

A preferred form of thermally responsive controlling device, useful in place of that illustrated in Fig. 1, and adapted to be used either in combination with or in place of a controller like that of Fig. 4, in a system such as illustrated in Figs. 8 and 9, or which may be used alone is shown in detail in Fig. 10. This control valve device Q is especially designed to insure accuracy of operation in spite of the wide fluctuations of temperature to which it is subjected, to reduce friction between the moving parts, and to provide a control valve of wide utility.

Referring to the construction illustrated in Fig. 10, the numeral 131 designates the base member or attaching flange of the improved controller device, such flange preferably being a standard flange adapted to be secured by bolts or the like to a complemental flange on a fitting forming part of a pressure fluid container, for example, the delivery pipe D (Fig. 8) leading from a superheater S. However, it is to be understood that this improved controller device may be attached to fluid pressure containers of other types, for example, directly to a generator such as the generator G of Fig. 8. The base or flange member 131 is integral with an upright portion 132 having a substantially cylindrical vertical bore 133 adapted to communicate at its lower end with the interior of the pressure fluid container with which the device is associated, such bore 133 forming a chamber for the reception of pressure fluid. The upper end of this bore is defined by a flange 134 integral with the member 132 and within which is snugly fitted a long, depending tube 135 of a metal which has a relatively high coefficient of expansion, for example brass or some other alloy especially designed to expand rapidly when subjected to increase in temperature. This tube 135 is welded or otherwise permanently united so as to form a leak-tight joint at the point 136 to the flange 134 and extends downwardly to the chamber 133 and to a substantial distance below the lower surface of the flange 131 so as to reach well into the pressure fluid in the container. Within the lower end of this tube there is arranged a cylinder 137 of a material having a relatively low coefficient of expansion as compared with the tube 135, and this cylinder is preferably welded or otherwise secured at 138 to the lower end of the tube so as to close such lower end against the entry of pressure fluid. Preferably the cylinder 137 terminates at a point below the lower surface of the flange member 131 and secured to its upper end is a cylinder or tube 140 preferably of a metal having a coefficient of expansion similar to that of the tube 135. The parts 140 and 141 may be united by a weld 141 or in any other suitable manner and the member 140 projects upwardly beyond the upper end of the tube 135 into a chamber formed by a casing 142 which is secured to the upper part of the member 132 by means of bolts 143 or the like, the upper surface of the member 132 forming the floor of this chamber.

The upper end of the member 140 is reduced in diameter to provide a shoulder upon which rests a yoke member 144 which is secured to the member 140 by screw threading the upper end of the latter and applying thereto a clamping nut which rests upon the upper surface of the member 144. The member 144 projects at opposite sides of the member 140 and is provided near its opposite ends with upright posts 145 which carry a bridge piece 146. This bridge piece has a screw-threaded opening at its center in axial alignment with the member 140 and this screw-threaded opening receives the adjusting screw 147. This screw has a cylindrical head which fits loosely within the lower end of a sleeve 148 to which it is pivotally secured by means of a loose rivet 149, the sleeve 148 being free to rock slightly with reference to the screw. Near its upper end the sleeve 148 has a transverse pin 150 extending at right angles to the rivet 149 and which passes through a transverse slot in the lower end of a rotary member 151 which turns in a bearing opening in the upper wall of the casing 142. The member 151 projects beyond the top wall of the casing and is provided with a knob 152 by means of which it may be turned thereby to turn the screw 147. Preferably this knob 152 is disposed within a housing cap 153 screw threaded or otherwise attached to the casing 142 and which may be locked to prevent surreptitious manipulation of the knob 152 by any suitable means, for example the wire and seal 154.

The base member 132 is provided with an overhanging portion 155 having a substantially horizontal bore 156 which is screw threaded at one end for the reception of an inlet pipe for pressure fluid. This pipe may, for example, correspond to the pipe 45 of Fig. 9 or at least a pipe or conduit leading from a space normally containing pressure fluid and from which such pressure fluid is on occasion to be released. From the chamber 156 a vertical bore 157 leads upwardly to the upper surface of the member 132, such bore being enlarged near its upper end and internally screw threaded for the reception of the lower end of a valve seat member 158 having a conical valve seat 159 defining a passage leading from the bore 157 to a chamber 160 within the valve seat member. From this chamber 160 one or more openings 161 lead to a chamber 162 within a casing 163 secured by bolts 163ª to the upper surface of the member 132.

The upper portion of the seat member 158 fits snugly within an opening in the upper wall of the casing member 163 and is provided with a vertical bore in axial alignment with the seat opening 159. This bore receives the sliding stem member 165 of a conical valve feather 165ª which cooperates with the seat 159 so as normally to prevent the flow of pressure fluid from the chamber 157 to the chamber 160. Preferably this stem 165 is provided with circumferential grooves to provide a fluid seal, and at its upper end is reduced in diameter to provide the neck portion 166 which projects up above the top surface of the casing member 163 and which has a head or enlargement 167 at its upper end.

The inner casing member 163 is provided with an upwardly extending portion providing a chamber 168 immediately above the upper end of the stem member 165, such chamber being open at one side as indicated at 169. Above the chamber 168 the casing member 163 is continued as a substantially cylindrical guide member 170 having a cylindrical bore in axial alignment with the valve seat 169 and within which bore slides an actuator member 171 preferably having cylindrical enlargements near its upper and lower ends which have sliding engagement with the walls of this bore. Near its upper end the member 171 is provided with a transverse pin 172 which projects out at opposite sides through a slot in the upper end of the member 170, the opposite ends of the pin 172 resting upon a collar 173 which in turn bears against the upper end of a coiled spring 174 encircling the upper part of the member 170 and resting upon a shoulder of the latter. A stop screw 175 is screwed into the threaded upper end portion of the member 170 and normally bears against the upper end of the member 171 thereby to limit the upward movement of the latter in response to the spring 174.

At its lower end the member 171 is provided with an enlarged head portion 176 having an upper member 177 disposed vertically above the valve stem member 165. The head 176 is also provided with a lower member 178 which is slotted to receive the neck portion 166 of the valve stem 165. Immediately above the head 167 of the valve stem there is arranged a block 179 secured to the head 176 but with a slight clearance between the under surface of the block and the head 167 when the parts are in normal position, that is to say, when the valve is closed. The block 179 is provided on its upper face with a horizontally elongate V-shaped groove 180 which receives a motion-transmitting ball 181.

At the opposite side of the casing 142 there are provided two fixed posts 182 secured in any desired manner to the member 132 and having at their upper ends cavities for the reception of balls 182 which form the fulcrum for one end of a flexible resilient lever member 184. This lever is provided in its upper surface with an elongate V-shaped groove 185 against the walls of which bears a ball 186 which is held within a cavity in the lower end of the adjusting screw 147. A thin flexible spring member 187 is secured at one end at the point 188 to the lever 184 and its opposite end is bent upwardly and forked and has its forked end resting upon the member 146 on the opposite sides of the adjusting screw 147. This spring forms a resilient support for the long arm 190 of the lever.

The opposite end 190ª of the lever rests upon the ball 181 and the latter is preferably limited in its movements by a spring member 191 secured to the under side of the lever. Preferably the surface of the lever which engages the ball 181 and the surface which rests upon the ball 183 are in substantially the same plane as the points of contact of the ball 186 with the side walls of the V-groove 185.

The overhanging portion 155 of the member 132 is provided with a vertical bore 192 leading down from the chamber 162 and into a horizontal bore 193 which, if desired, may be screw threaded for the reception of an exhaust pipe leading to any desired point. However, this pipe may be dispensed with if preferred, the pressure fluid being allowed to exhaust directly from the end of the bore 193 into the atmosphere.

Preferably, in order to remove any condensate which might collect in the interior of the casing 142, there is provided a drain opening 194 leading to a socket in which may be screwed a drain pipe 195 leading to any desired point of discharge. Preferably a stop screw 196 is screwed into a threaded opening in the upper part of the casing 163, with its head immediately beneath the long arm 190 of the lever 184 so as to limit downward movement of said arm.

The screw 175 is adjusted by the maker to provide a clearance, preferably of the order of 0.002 inch between the under surface of block 179 and the upper surface of the head 167 of the valve stem when the valve feather 165ª is seated and the top of the actuator guide 171 is in contact with the screw 175. There is also a clearance of the order of 0.002 inch between the under surface of the head 167 and the top surface of the slotted member 178 when the valve is seated.

In the operation of this device, and assuming that it is so arranged as to take the place of the controller device Z of Figs. 8 and 9, and assuming that the pipe 45 of Fig. 9 leads to the bore 156 of the controller Q, and assuming that the valve 165ª is closed against its seat 159, the parts will remain in this position until the temperature in the pressure fluid container reaches the point at which the relief valve V is designed to blow. When the temperature substantially reaches this point the tube 135 will have so elongated as to cause the part 146, together with the adjusting screw 147, to move downwardly thereby pressing the ball 186 against the lever 184, causing the latter to flex and thus store up energy. When the lever has been bent to a certain degree in response to the continued elongation of the tube 135, the end 190ª of the lever will press so forcibly against the ball 181 as to move the latter down in opposition to the spring 174, closing the gap between the lower surface of the block 179 and the head 167 of the valve stem and eventually unseating the valve 165 very slightly from the seat 159, the back pressure in the space 157 being the sole leading means that normally keeps the feather tight against its seat. As soon as the valve 165ᵃ leaves its seat, the pressure fluid in the back pressure chamber 62 of the relief valve V escapes through the valve seat 159 to such an extent that the pressure beneath valve feather 165ᵃ is very substantially lowered, the chamber 162 and communicating passages being of limited capacity. Immediately, upon such substantial lowering of the back pressure against the under surface of the valve feather 165ᵃ, the stored-up energy of the resilient lever 164 snaps the valve open to its fullest extent, whereupon the pressure in the chamber 162 drops suddenly to just below the amount required to permit the main valve feather 60 to open. This condition is obtained by the proper relative dimensioning of the steam passages in the main and pilot valve and the elasticity of the flexible member 184.

In this modified construction of Fig. 10, the stem 165 of the valve feather 165ᵃ is guided accurately in a rectilinear path so that the valve feather always seats squarely and firmly, and since the ball 181 is free to roll in the V-groove 180, the stem 165 is not subjected to any side thrust by reason of the arcuate movement of the end 190ᵃ of lever 184, thus avoiding any tendency to cause the stem to bind in its guideway. By arranging the contact ball 186 at the lower end of the screw 147 with provision for turning the screw from a point outside of the casing, it is possible readily and quickly to calibrate the controlling device so as to operate accurately at the desired temperature, while the use of balls as the contact elements between the lever and the other parts assures a substantially frictionless transmission of the considerable forces involved.

The bore 133 provides a jacket for the upper part of the tube 135 so that a substantial length of the latter is always subjected to the pressure fluid. Preferably, all of the active structure within the base and the casing 142, for example, the parts 140, 144, 145, 146, etc., are made of the same material or of one having the same coefficient of expansion as the tube 135, so that as the temperature of the base 132 suddenly rises when the valve 165ᵃ opens and high temperature pressure fluid enters the spaces 156, 162 and 193, the operative parts all expand at substantially the same rate, thus avoiding inaccuracies due to differential expansion.

After the valve has opened and the temperature of the pressure fluid in the container has dropped, the end 190 of lever 184 rises and spring 174 gradually moves the valve feather 165ᵃ toward its seat. When the valve feather is still 0.002 inch from its seat, the actuator part 178 is stopped by the screw 175 and thereafter, increasing fluid pressure beneath the valve feather 165ᵃ seats the latter without opposition from the actuator parts. The stop screw 196 is so adjusted by the maker that when lever 184 has been flexed to a maximum extent and contacts with the stop screw, the valve feather 165ᵃ is spaced from its seat by a distance of the order of $\frac{3}{32}$ of an inch.

While we have illustrated desirable embodiments of the invention by way of example, we wish it to be understood that various changes in size, proportion and arrangement of parts, as well as the substitution of other materials than those specifically mentioned, may be made without departing from the spirit of the invention. Other useful arrangements may suggest themselves to those skilled in the art, but we contemplate that all such arrangements as fall within the scope of the appended claims are to be regarded as forming a part of this invention.

We claim:

1. In a valve apparatus of the kind which comprises a casing having therein a valve seat defining the outlet to a space in which fluid pressure is normally maintained, and a valve feather cooperating with the seat and normally closing said outlet, one side of the valve feather being exposed to the fluid pressure in said space and its opposite side being exposed to a lesser pressure, said valve feather being arranged to open against the fluid pressure in said space, in combination, valve actuating means comprising a movable part operative to unseat the valve feather, a resilient lever for moving said part, a rolling element interposed between said part and the lever, said rolling element being movable longitudinally of the lever, a fulcrum for the lever, and a motor device for swinging the lever about its fulcrum, the parts being so designed and arranged that the lever first flexes before fully unseating the valve feather thereby to store up energy for suddenly opening the valve to full capacity immediately after it begins to leave its seat.

2. In a relief valve apparatus of the kind which includes a housing having therein a valve seat, a main valve feather constituting a movable wall for a fluid chamber otherwise closed except for a restricted fluid passage and a duct of relatively greater capacity, and a control device including a control valve feather normally closing said duct, and means guiding said feather to move in a substantially rectilinear path, in combination, valve actuating means comprising a motor device including a movable part, a lever having a short arm and a relatively long arm, means for transmitting movement from said movable part to the short arm of the lever, and substantially unyielding motion transmitting means interposed between the free end of the long arm of the lever and the control valve feather, said motion transmitting means including a freely rolling ball movable longitudinally of the lever thereby to avoid cramping of the valve feather by reason of the arcuate movement of the end of the lever.

3. In a relief valve apparatus of the kind which includes a housing having therein a main valve seat, a main valve feather, and a back pressure chamber having a restricted entrance for pressure fluid and in which sufficient pressure is normally maintained to hold the main valve feather to its seat, and a control device including a rectilinearly reciprocable control valve feather normally closing an exhaust passage leading from said back pressure chamber, in combination, valve actuating means comprising a motor device including a reciprocable part, a lever arranged to be swung about a fulcrum point by movement of said reciprocable motor part in one direction, and a bearing ball operative to transmit motion from the lever to the control valve feather, said ball being freely movable lengthwise of the lever.

4. In a control valve apparatus of the kind including a casing having therein a space for pressure fluid, a valve feather normally closing a duct of substantial capacity connecting said space with a chamber otherwise closed except for a relatively restricted passageway for fluid, and guide means constraining the valve feather to move axially in a rectilinear path, said valve feather being arranged to open against the pressure in said duct, in combination, valve actuating means within the casing comprising a resilient valve opening lever, a motor device, means actuable by said motor to move the lever thereby to unseat the valve feather to open said duct, said means including a bearing ball freely movable longitudinally of the lever.

5. Valve actuating means operative to unseat a normally closed valve feather from its seat, said actuating means comprising a part provided with a slot, a resilient lever, fixed fulcrum means for the lever, one end of the lever being disposed within the slot in said part, an anti-friction ball disposed between the lever and an adjacent wall of the slot in said part, the ball being movable along said wall, longitudinally of the lever, and motor means operative to flex the lever thereby to unseat the valve feather.

6. Valve actuating means operative to unseat a normally closed rectilinearly movable valve feather from its seat, said actuating means comprising a motor device including a movable part, a pressure applying ball associated with said part, a lever having a cavity in which the ball rests, a fulcrum for one end of the lever, and substantially unyielding motion-transmitting means interposed between the other end of the lever and the valve feather, said motion-transmitting means comprising a rigid ball arranged for free movement longitudinally of the lever thereby to avoid cramping of the feather by reason of the arcuate movement of the end of the lever.

7. Valve actuating means operative to unseat a normally closed valve feather from its seat, said actuating means comprising a resilient lever, a fulcrum for said lever, one end of the lever being arranged to actuate the valve feather, a spring supported at one end and having its other end bearing upon the lever at a point remote from the fulcrum of the latter, motor means comprising a movable part, and adjustable means actuable by said movable part and adapted to bear upon the lever at a point intermediate the ends of the latter whereby operation of the motor means is effective to unseat the valve feather.

8. Actuating means for unseating a normally closed valve feather of the kind having a guiding stem which slides axially in a rigid bearing, said actuating means comprising a movable part provided with an elongate guideway substantially perpendicular to the axis of the stem, a ball free to roll along said guideway, a lever having one end resting on said ball, a fulcrum for the lever, and motor means for swinging the lever about its fulcrum.

9. Actuating means for unseating a normally closed valve feather of the kind having a guide stem which slides axially in a rigid bearing and which has a head at its end, said actuating means having parts disposed above and below said head, stop means operative normally to position said parts so that they are spaced slightly from the head, the part above the head having a ball support, a ball resting on said support, a lever having one end resting on the ball, a fulcrum for the lever, and motor means for swinging the lever about its fulcrum thereby to unseat the valve.

10. Actuating means for unseating a normally closed valve feather of the kind having a stem which slides axially in a rigid bearing having a rectilinear slideway for the stem, said actuating means comprising a movable part having a ball support disposed above the end of the stem, said ball support having a V-groove extending substantially perpendicular to the axis of the stem, a ball in said groove, a lever having one end resting on the ball, a second ball constituting a fulcrum for the lever, and lever actuating motor means comprising a moving part, and a third ball interposed between said latter part and the lever, the points of contact of the several balls with the lever being substantially in the same plane.

11. Valve actuating means operative to unseat a normally closed rectilinearly movable valve feather from its seat, said actuating means comprising a resilient valve opening lever, a pair of spaced balls constituting a two-point fulcrum for said lever adjacent to one end thereof, the other end portion of the lever being arranged to actuate the valve feather, and substantially unyielding motion-transmitting means interposed between the other end of the lever and the valve feather, said motion-transmitting means comprising a rigid ball arranged for free movement longitudinally of the lever thereby to avoid cramping of the valve feather by reason of the arcuate movement of the end of the lever, motor means comprising a movable part, and an anti-friction ball interposed between said movable part and the lever and bearing upon a part of the lever at a point intermediate the ends of the latter whereby operation of the motor means is effective to unseat the valve feather and thereby open said duct.

JAMES BRISCOE.
RUDOLF BECK.